June 24, 1930.  C. R. SHORT  1,768,529
METHOD OF MAKING BEARINGS

Filed May 5, 1927

Inventor
Charles R. Short
By Spencer Hardman and Fehr
his Attorneys

Patented June 24, 1930

1,768,529

UNITED STATES PATENT OFFICE

CHARLES R. SHORT, OF DETROIT, MICHIGAN, ASSIGNOR TO THE MORAINE PRODUCTS CORPORATION, OF DAYTON, OHIO, A CORPORATION OF OHIO

METHOD OF MAKING BEARINGS

Application filed May 5, 1927. Serial No. 188,930.

This invention relates to the manufacture of articles having surfaces adapted to be placed in rubbing contact with a relatively movable part such as a bearing for a shaft or a guide for a reciprocating part.

One object of the present invention is to provide an improved method of making a bearing, guide or similar part comprising a contact portion of relatively porous metal capable of containing a lubricant and a portion of metal of relatively high mechanical strength.

Briefly, this object is accomplished by forming a relatively thin sheet or plate of porous metal and permanently attaching it to the piece of stronger metal which serves as a support and reenforcement for the porous metal.

In my copending application, Serial No. 188,929, filed May 5, 1927, I have disclosed the manufacture of a machine element having a flat bearing surface. This element is made by first forming a thin sheet of porous metal in a manner which I shall describe in detail later; and then joining the sheet of porous metal to the plane surface of a body of relatively dense, strong metal by a bond which is substantially coextensive with the contiguous surfaces of the united parts. Such a machine element may be used as a thrust bearing or a gib.

In this application I shall disclose the manufacture of a machine element having a curved or cylindrical bearing surface which is provided by bending a flat sheet of porous metal into the desired shape, and then joining it to a suitable cylindrical surface provided by a reinforcing member of denser, stronger metal.

Further objects and advantages of the present invention will be apparent from the following description, reference being had to the accompanying drawings wherein a preferred embodiment of one form of the present invention is clearly shown.

Figure 1:
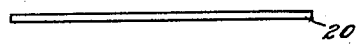
Fig. 1 is an edge view of a thin sheet of porous metal.

The porous metal plate designated by numeral 20 in Fig. 1 is preferably constructed by briquetting a mixture of bronze forming metal powders, a filler such as graphite and a volatile void forming substance such as salicylic acid, and then sintering this form under nonoxidizing conditions at a temperature and for a time sufficient to cause the metal particles to unite and the void forming substance to volatilize and to produce a metal structure interspersed with a number of minute intercommunicating voids for receiving lubricant. Examples of the manufacture of porous metal are disclosed in Patent 1,642,347, issued Sept. 13, 1927, to H. M. Williams.

Figure 2:
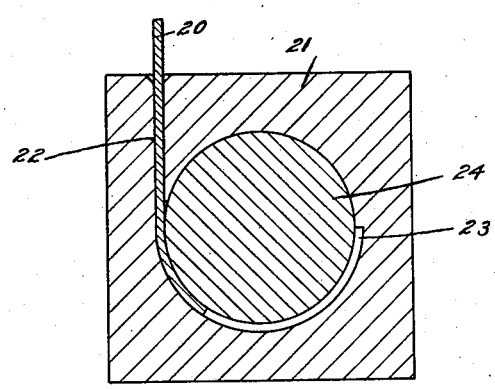
Fig. 2 is a sectional view showing an apparatus for bending the porous metal sheet into a preliminary form.
Figure 3:
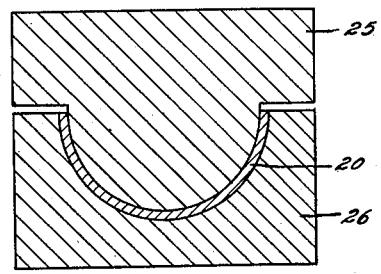
Fig. 3 is a view partly in section showing apparatus for bending the porous metal sheet into final form.

Before the bearing plate can be used as a shaft journal or crank-pin bearing, it is bent into semi-cylindrical form by use of the apparatus shown in Figs. 2 and 3. Fig. 2 shows a block 21 provided with a straight groove 22 merging with a semi-circular groove 23 which partly surrounds a cylindrical plug 24 which is supported by the block 21, but may be removed therefrom. The plate 20 is pushed into the groove 22 and then into the groove 23 in order to give it a semi-cylindrical shape. The plug 24 may be withdrawn from the block to facilitate removal of the plate 20. On being removed, the plate 20 will spring out of shape, so that a further operation to give it a final form is required. This operation is performed by squeezing the plate 20 between relatively movable members 25 and 26 shown in Fig. 3. It has been found desirable to use the apparatus shown in Fig. 2 to perform a preliminary bending step because the material is relatively weak in tensile strength and if subjected while in the flat state to the action of members 25 and 26, the tensile strain to which it is subjected might be so great at certain points as to destroy the sheet entirely. The apparatus of Fig. 2 overcomes this difficulty by causing the piece to be bent gradually from flat to cylindrical form.

While the porous metal plate may be bent in other ways into the desired form, the one which has been described is particularly suitable on account of the character of the material worked upon. There is considerable resistance offered to the forcing of the plate 20 through the grooves 22 and 23 due to friction between the plate and the walls of the grooves. As the porous metal is being bent it is being compressed to a substantial degree in the direction of its movement through the grooves. This compressing or compacting of the structure of the porous metal tends to offset the tendency to pull apart those portions which would ordinarily be in tension during the bending operation. In other words the compacting of the plate overcomes its tendency to crack at its surface of greater curvature. Due to its porosity the plate 20 can be compacted to a substantial degree as it is driven through the grooves 22 and 23; therefore the method of bending disclosed herein has proved satisfactory.

The curvature of the mandrel 24 is preferably substantially the same as that of the shaft which is to be supported by the bearing; but this is not essential. The mandrel 24 could even be smaller in diameter than the shaft for the bearing, since the bearing plate would spring to a curvature of greater radius than the mandrel, when the plate is removed from the groove 23.

Although preferable, it is not necessary that the groove 23 be a semi-cylinder. It might be a segment of a cylinder and have an angular extent sufficient only to cause the plate to take a permanent set. It is desirable however to use a groove having the maximum angular extent because the greater the frictional resistance to the movement of the plate 20 into the grooves 22 and 23 the greater will be the tendency to compact the plate while it is being bent, thus preventing cracking as explained in the second preceding paragraph.

Figure 4:
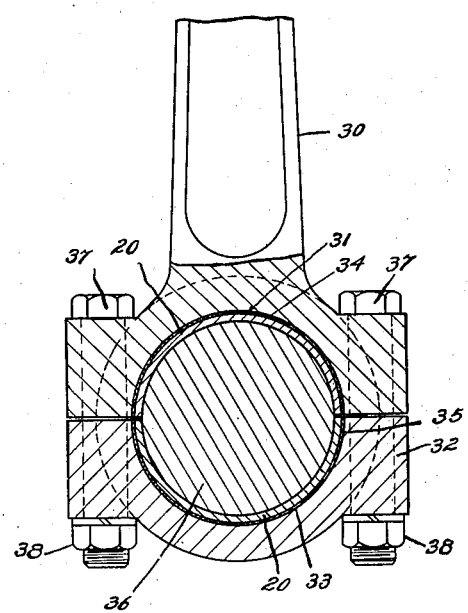
Fig. 4 is a fragmentary view, partly in section, of a connecting rod provided with a bearing according to the present invention.

Fig. 4 shows the applicaton of semi-cylindrical bearings to the crank-pin end of a connecting rod. A connecting rod 30 is provided with a cylindrical surface 31 adapted to receive the porous metal bearing of a predetermined thickness, and a connecting-rod cap 32 is provided with a similarly formed cylindrical surface 33. The surfaces 31 and 33 are coated with a metal, for example tin, which is adapted to alloy, bond or unite with the metal of the connecting-rod cap, ferrous metal for example, and to alloy with the porous metal bearing part 20, which is preferably of porous bronze. The tin coat is indicated at 34 and 35 on Fig. 4, but it will be understood that this drawing greatly exaggerates the thickness of the tin coat. For a good bond this coat should be uniform but as thin as possible. The bearing parts 20 are assembled as shown in Fig. 4 between the connecting rod 30 and the cap 32 and a mandrel 36 which is substantially the same diameter as the crank pin for which the connecting rod is intended to be used. The assembly is clamped about a cylinder 36 by bolts 37 and nuts 38; and, while thus assembled, the assembly is heated to a temperature sufficient to cause the tin or other coating to unite with the bearing parts as well as with the connecting rod parts. After the assembly is cooled, the clamping bolts are removed, leaving the bearing part 20 permanently joined to a connecting rod part.

The bearing 20 may be impregnated with lubricant by immersing the entire structure in a bath of hot oil, or they may absorb some of the excess oil which is delivered to the crank pin with which the connecting rod is used.

The heating of the assembly is performed preferably in a bath of molten salts having a melting point of a proper temperature.

Figure 5:
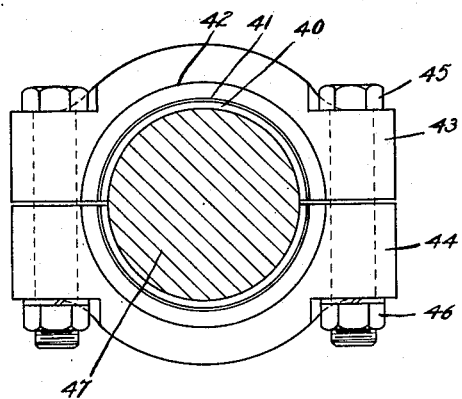
Fig. 5 is a side view of apparatus used in manufacturing the elements of a shaft bearing, for example, one of the main bearings of an engine crank shaft.
Figure 6:
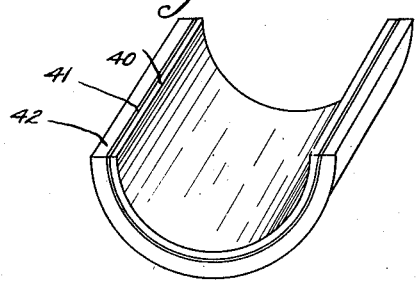
Fig. 6 is a perspective view of a bearing part shown in Fig. 5.

Figs. 5 and 6 show the method of manufacturing two-part bearings for shafts such as the crank-shafts of engines. A flat sheet of porous metal is bent into semi-cylindrical form 40 and placed against the bond coating 41 of a previously coated reinforcing shell 42. Two of these assemblies are clamped against a cylinder 47 and between two clamps 43 and 44 by tightening the nuts 46 on the bolts 45 which pass through the clamps. This assembly is heated to a temperature sufficient to melt the bonding metal 41 and to cause it to alloy or unite with the metal of the shells 42 and the metal of the bearings 40. After cooling the assembly the clamps are removed, thus producing two half-bearings each comprising a shell of dense, strong metal surrounding a porous metal bearing. These bearings may be impregnated with lubricant before using, if so desired.

While the form of embodiment of the present invention as herein disclosed, constitutes a preferred form, it is to be understood that other forms might be adopted, all coming within the scope of the claims which follow.

What is claimed is as follows:

1. The method of making a bearing for shafts and the like which comprises: forming a relatively thin, flat plate having a porous metallic structure forming the porous plate while in detached condition into the desired cylindrical shape and then attaching the formed porous plate to a preformed reinforcing body by a metallic bond.

2. The method of making a bearing for shafts and the like which comprises: forming a relatively thin plate having a porous metallic structure, gradually forming the porous plate into cylindrical form while in detached condition, and then attaching the formed porous plate to a preformed metal reinforcing body by a metallic bond which is substantially coextensive with the contiguous surfaces of the bodies.

3. The method of making a bearing for shafts and the like, which comprises: forming to approximately final shape a detached bearing lining of a porous metallic structure, inserting this porous lining into a correspondingly shaped bearing back having its contacting metal surface adapted to alloy with said porous lining, clamping said porous lining in firm surface contact with said bearing back by means of an arbor fitting within said lining, and then heat-treating this assembly to cause the porous lining to unite with the metal of the bearing back.

4. The method of making a bearing for shafts and the like, which comprises: forming to approximately final shape a detached bearing lining of a porous metallic structure, inserting this porous lining into a correspondingly shaped bearing back having its contacting metal surface coated with a metal having an affinity, to said porous lining clamping said porous lining in firm surface contact with said coated surface of the bearing back by means of an arbor fitting within said lining, and then heat-treating this assembly to cause the porous lining to unite with the metal of the bearing back.

In testimony whereof I hereto affix my signature.

CHARLES R. SHORT.